(12) United States Patent
Engel et al.

(10) Patent No.: US 10,727,755 B2
(45) Date of Patent: Jul. 28, 2020

(54) METHOD FOR CONTROLLING A SWITCH MODULE BASED ON THYRISTOR SWITCHING ELEMENTS

(71) Applicant: Maschinenfabrik Reinhausen GmbH, Regensburg (DE)

(72) Inventors: Stefan Engel, Kaufungen (DE); Rik W. de Doncker, Leuven (BE)

(73) Assignee: MASCHINENFABRIK REINHAUSEN GMBH, Regensburg (DE)

( * ) Notice: Subject to any disclaimer, the term of this patent is extended or adjusted under 35 U.S.C. 154(b) by 0 days.

(21) Appl. No.: 16/463,387

(22) PCT Filed: Nov. 15, 2017

(86) PCT No.: PCT/EP2017/079331
§ 371 (c)(1),
(2) Date: May 23, 2019

(87) PCT Pub. No.: WO2018/095782
PCT Pub. Date: May 31, 2018

(65) Prior Publication Data
US 2020/0136607 A1    Apr. 30, 2020

(30) Foreign Application Priority Data

Nov. 23, 2016   (EP) .................................... 16200251

(51) Int. Cl.
*H02M 5/257*   (2006.01)
*H02M 1/08*   (2006.01)
*H02M 5/12*   (2006.01)
*H01F 29/04*   (2006.01)

(52) U.S. Cl.
CPC .......... *H02M 5/2573* (2013.01); *H01F 29/04* (2013.01); *H02M 1/081* (2013.01); *H02M 5/12* (2013.01)

(58) Field of Classification Search
CPC ...... H02M 1/081; H02M 5/12; H02M 5/2573; H01F 29/04
See application file for complete search history.

(56) References Cited

U.S. PATENT DOCUMENTS 3,619,765 A     11/1971  Wood
7,187,149 B1 *   3/2007  Balog, Jr. ............... H02P 27/16
                                                       318/434

FOREIGN PATENT DOCUMENTS

EP           2980941 A1      2/2016

OTHER PUBLICATIONS

Stefan P Engel et al: "Control of thyristor-based commutation cells", Energy Conversion Congress and Exposition (ECEE), 2012 IEEE, Sep. 15, 2012 (Sep. 15, 2012), pp. 2030-2037, XP032467378.

* cited by examiner

*Primary Examiner* — Patrick O Neill
(74) *Attorney, Agent, or Firm* — Leydig, Voit & Mayer, Ltd.

(57) ABSTRACT

A method of controlling at least one switching module having commutation cells which are associated with a regulating winding of a regulating transformer, the commutation cells including: a first and second switching element each having two thyristors in antiparallel connection.

10 Claims, 9 Drawing Sheets

METHOD FOR CONTROLLING A SWITCH MODULE BASED ON THYRISTOR SWITCHING ELEMENTS

CROSS-REFERENCE TO PRIOR APPLICATIONS

This application is a U.S. National Stage Application under 35 U.S.C. § 371 of International Application No. PCT/EP2017/079331 filed on Nov. 15, 2017, and claims benefit to European Patent Application No. EP 16200251.3 filed on Nov. 23, 2016. The International Application was published in German on May 31, 2018, as WO 2018/095782 A1 under PCT Article 21(2).

FIELD

The invention relates to a method of controlling a switching module based on thyristor semiconductor switching elements.

BACKGROUND

The publication 'Control of Thyristor-Based Commutation Cells' published in the context of the IEEE Energy Conversion Congress and Exposition (Raleigh, N.C., USA, September 2012) describes a method for control of a commutation cell. The described system arrangement comprises a transformer with a primary side consisting of a main winding and a regulating winding and a secondary side with a secondary winding. The regulating winding of the primary side can be connected with the main winding by means of an arrangement consisting of four semiconductor switching elements in three different forms. In a first switching mode the regulating winding can be connected in series with the main winding. In a second switching mode the regulating winding can be connected with the main winding in opposition. In a third switching mode the regulating winding can be disconnected from the circuit, i.e. no current is conducted by the regulating winding. Accordingly, the four semiconductor switching elements and the regulating winding together form a switching module. The switching module comprises two commutation cells. Each commutation cell comprises an upper and a lower current path. The two current paths can each be switched to the state 'conducting' or 'blocking' by a thyristor pair in antiparallel connection. Depending on the state in which the thyristor pair is disposed, either the upper or the lower path constantly conducts current.

The publication describes two possible commutation strategies for commutation of a current from an initially conducting path to an initially blocking path. According to a first commutation strategy, as soon as conditions favourable to commutation prevail a previously defined commutation instant is waited out. When this commutation instant is reached, the thyristor pair previously switched to be conducting is deactivated and a dead time is waited out, which ensures that no unexpected back-triggering of the thyristors occurs. After expiry of the dead time, the previously blocking thyristor pair is activated, commutation of the current from the previously conducting path to the previously blocking path takes place and the commutation is concluded. If favourable conditions for commutation are not fulfilled, commutation in accordance with a second commutation strategy, which is also termed forced commutation or commutation by way of short-circuit, is initiated.

U.S. Pat. No. 3,619,765 describes a regulating unit and a method for connecting winding taps of a transformer with an electrical mains. The transformer connects an alternating voltage source with a load. A semiconductor switching element is associated with each winding tap of the transformer and respectively consists of two thyristors in antiparallel arrangement.

According to the method, switching actions increasing the load voltage are allowed only when the flow of power is directed from the alternating voltage source to the load. Switching actions reducing the load voltage are allowed only when the flow of power is from the load to the alternating voltage source. In addition, switching actions in the vicinity of the zero transitions of load current and alternating voltage are supressed. In this way, short-circuits of the winding taps during switching over from a first winding tap to a second winding tap are precluded.

The state of the art methods for control of commutation cells in that regard do not take into consideration distorted, particularly rapidly changing, load currents. Distorted load currents in the case of the state of the art methods can have the consequence of unexpected short-circuits of the winding parts, which are to be connected, due to unexpected change of current direction.

Thyristors are power semiconductors which in electronic power systems are designed for switching high electrical currents and voltages. The following terms are used hereinafter in connected with a thyristor:

'main voltage' is the voltage between an anode and a cathode of a thyristor;

'main current' is the current through the cathode of a thyristor;

'control voltage' is the voltage between the gate and the cathode of a thyristor, this being positive when the gate has the higher potential by comparison with the cathode;

'control current' is the current through the gate of a thyristor;

'trigger current' is a control current flowing into the gate, the control current of a thyristor then being positive;

'forward direction' is the direction from anode to cathode;

'forward voltage' is the main voltage poled in forward direction, the main voltage then being positive;

'forward current' is the main current flowing in forward direction, the main current then being positive;

'reverse direction' is the direction from cathode to anode;

'reverse voltage' is the main voltage poled in reverse direction, the main voltage then being negative;

'blocking state' and 'conducting state' are the two stable operating states which the thyristor can adopt when a forward current flows; and 'latching current', 'holding current' and 'recovery time' are characteristic variables of the respective thyristor and are usually indicated in the data sheet thereof.

A thyristor can be brought into the conducting state, which is also termed triggering or switching on, in that a forward voltage is applied and a positive control voltage is applied at least temporarily, typically for approximately 10 µs, and a trigger current generated until the forward current exceeds the latching current. The thyristor now remains in the conducting state even when the control current extinguishes or even is reversed in polarity, but only as long as the forward current does not exceed the holding current and the forward voltage is applied. However, as soon as the main voltage is reversed in polarity so that there is a reverse voltage from the forward voltage or the forward current drops below the holding current the thyristor goes over into the blocking state, which is also called extinguishing or switching off. In addition, in the following 'deactivate' means deactivation of the gate drive so as to prevent triggering of the thyristor. Correspondingly, 'activate' means to make triggering possible by driving of the gate of the thyristor.

Normal thyristors, which are also termed naturally commutating thyristors, can be extinguished only in the aforedescribed manner. Gate turn-off (GTO) thyristors can additionally also be extinguished in that an extinguishing current is generated. Thus, normal thyristors usually extinguish at the earliest when the main current reaches the next zero transition, whereagainst GTO thyristors can be extinguished at any desired instant. Normal thyristors are at present designed for, for example, currents up to 2.2 kA and more and for voltages up to 7 kV and more, whereas GTO thyristors at present can be designed only for lower currents and voltages and are more expensive.

After extinguishing, the thyristor needs a certain period of time until it can again accept a voltage in forward direction. This time period is termed hold-off interval and is formed from the sum of the recovery time and a safety margin.

As control of a commutation cell it is to be generally understood in the following that the commutation cell is driven in such a way that the desired switching state can be reliably achieved.

Moreover, a distinction can be made between normal commutation and forced commutation. The term "normal commutation" is used when the current through the previously conducting switching element of a commutation cell commutates directly and within a short time to the previously blocking switching element. In that regard, the physical commutation, in which the current commutates from one load branch to the other, takes place—in normal commutation—in a time range with respect to which load current and induced voltage have different signs. By contrast, in the case of forced commutation the commutation takes place by way of an intentional transient short-circuit. During the short-circuit current which builds up and diminishes again after the voltage zero transition, the previously conducting switching element or thyristors thereof has or have sufficient time to recover. By contrast to normal commutation, forced commutation can be carried out at any time.

SUMMARY

According to an embodiment of the present invention, a method is provided for controlling at least one switching module, which has a first commutation cell and a second commutation cell, which are each associated with a regulating winding of a regulating transformer by way of a first terminal and a second terminal, each of the at least one switching module being provided with a feed-in line and a feed-out line, and the first commutation cell and the second commutation cell including: a first switching element having two thyristors in antiparallel connection; and a second switching element having two thyristors in antiparallel connection. The method includes determining a tap voltage, which is present between the first terminal and the second terminal and represents a voltage across the regulating winding of the regulating transformer; determining an induced voltage representing the induced voltage in the regulating winding; detecting a load current flowing from the feed-out line of the commutation cell; And determining a phase displacement φ between the load current and the tap voltage. After receipt of a commutation command for commutation of a current from the first switching element to the second switching element, then in accordance with a first commutation strategy, a first check is carried out. The first check includes: determining whether the phase displacement φ between the load current and the tap voltage lies outside a limit range, and evaluating the result of the first check as positive when the phase displacement φ lies outside the limit range. A second check is carried out, that includes: determining whether a time to a next anticipated zero transition of the tap voltage is greater than a commutation time period and that the result is evaluated as positive if this is the case; if the first check and the second check are positive, the commutation process is prepared in a step in that a first thyristor of the two thyristors belonging to the first switching element and lying in a blocking direction with respect to the induced voltage is deactivated and a second thyristor of the two thyristors belonging to the second switching element and lying in a blocking direction with respect to the tap voltage is activated. After the preparation of the commutation process, then in another step: as long as the time to the anticipated next zero transition of the tap voltage is greater than the commutation time period, a third check is carried out as to whether the first thyristor has become free and the third check is evaluated as positive if this is the case; and if the third check is evaluated as positive, the commutation is initiated in a step in that a third thyristor of the two thyristors belonging to the second switching element and lying antiparallel to the second thyristor is activated, and a fourth thyristor of the two thyristors belonging to the first switching element and lying antiparallel to the first thyristor is deactivated; and if the first check and/or the second check is/are not evaluated as positive, no commutation is initiated, or if the third check is not evaluated as positive the commutation in accordance with the first commutation strategy is broken off.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Embodiments of the present invention provide a method of controlling a switching module based on thyristor semiconductor switching elements. In an exemplary embodiment, a method of controlling at least one switching module is provided, where the switching module includes a first commutation cell and a second commutation cell, which are each associated with a regulating winding of a regulating transformer by way of a first terminal and a second terminal. Each switching module is provided with a feed-in line and a feed-out line.

Embodiments of the present invention provide a method for control of a switching module based on semiconductor switching elements so that the electrical loading of the individual semiconductor switching elements is reduced.

Against this background, embodiments of the present invention provide a method of controlling at least one switching module which consists of a first commutation cell and a second commutation cell. The commutation cells are each associated with a regulating winding of a regulating transformer by way of a first terminal and a second terminal. Each switching module is provided with a feed-in line and feed-out line. In that case, the commutation cells comprise a first switching element and a second switching element each consisting of two thyristors in antiparallel connection.

In the context of the method for control of a switching module, the following variables are determined:

- an alternating voltage, which is termed tap voltage and which lies between the first and second input terminals and represents the voltage across the regulating winding of the regulating transformer;
- an alternating voltage, which is termed induced voltage and represents the induced voltage in the regulating winding;
- an alternating current, which is termed load current and which flows from the feed-out line of the commutation cell; and
- the phase displacement between the load current and the tap voltage.

In the context of the method, for commutation of a current from the first switching element to the second switching element in accordance with a first commutation strategy a first check is carried out after receipt of a commutation command. In that case, it is checked whether the phase displacement between the load current and the tap voltage lies outside a limit range. The result of the first check is evaluated as positive if the phase displacement lies outside the limit range.

In addition, a second check is carried out as to whether the time to the next anticipated zero transition of the tap voltage is greater than a commutation time period and the result is evaluated as positive if this is the case. In that regard, the commutation time period is the sum of an overlap time and a hold-off interval of the thyristors. The overlap time describes the time during the commutation in which both switching elements are conducting. The hold-off interval of the thyristors is composed of the recovery time of the thyristors and a safety margin. The safety margin in that case can also be variable and depend on, for example, the amount of the induced voltage or the current at the thyristor at a specific instant. The result of the check is evaluated as positive if the time to the anticipated next zero transition of the tap voltage is greater than the commutation time period.

If the first and second checks are positive, the commutation process is prepared in that a first thyristor belonging to the first switching element and lying in blocking direction with respect to the induced voltage is deactivated. A second thyristor belonging to the second switching element and lying in blocking direction with respect to the induced voltage is activated.

After preparation of the commutation process, as long as the time to the anticipated next zero transition of the tap voltage is greater than the commutation time period a third check is carried out as to whether the first thyristor has become free. The check is evaluated as positive if this is the case.

If the third check is evaluated as positive, commutation is initiated in that a third thyristor lying antiparallel to the second thyristor is activated and a fourth thyristor lying antiparallel to the first thyristor is deactivated.

If the first check and/or second check is or are not evaluated as positive, commutation in accordance with a first commutation strategy is not initiated. If the third check is not evaluated as positive, commutation in accordance with the first commutation strategy is broken off.

The tap voltage can be measured directly, for example by means of a voltage sensor. The induced voltage can be measured directly if no current is conducted by the regulating winding. If a current flows in the regulating winding, the induced voltage can be determined by measuring the load current as well as the tap voltage on a model basis. A further possibility for determination of tap voltage and induced voltage is, for example, measurement of load current and tap voltage at a further (regulating) winding of the transformer and the use of known model-based computations of the induced voltage and the tap voltage, for example on the basis of the admittance matrix of the transformer.

A thyristor counts as activated if the gate voltage thereof is controlled so as to enable triggering. Analogously, a thyristor counts as deactivated if the gate thereof is not controlled, so as to prevent triggering of the thyristor.

The thyristors can be constructed as, for example, normal thyristors or as optically triggered thyristors.

The activation and deactivation of the thyristors are carried out by way of a control unit. This control unit is, in addition, constructed for the purpose of detecting relevant measurement variables such as, for example, the tap voltage or load current by way of sensors constructed in correspondence with that purpose. Further relevant control variables such as, for example, induced voltage or phase displacement between load current and tap voltage can be determined from the measurement variables or data, which are detected by means of the sensors, by way of determination and computation methods known from the prior art. For the sake of clarity and simplicity the sensors used for determination of the measurement variables are not discussed in more detail, since it is clear to an expert which sensors are to be used in order to determine the relevant measurement variables.

The invention enables reliable operation of tap changers and other devices with thyristor-based switching modules, even in the case of distorted load currents, without an undesired short-circuit arising between the first and second terminals. A short-circuit of the regulating winding leads to high short-circuit currents due to the low impedance of the winding. These high short-circuit currents are undesirable, since the switching elements or thyristors in the case of an optimised system design are not designed for high short-circuit currents of longer duration. Frequently occurring, high short-circuit currents lead to high loading of the switching elements or thyristors, which has a negative influence on the service life thereof. This applies especially when frequent switching operations are required. Accordingly, short-circuits should be avoided as far as possible.

In addition, it is ensured by the proposed method that at least one thyristor of each commutation cell is conductive in flow direction at every point in time. Moreover, through the method according to the invention a smaller dimensioning of the thyristors is also advantageously made possible, which creates additional free spaces with respect to installation space and insulation distances.

One form of embodiment of the proposed method specifies that commutation is broken off in that the second thyristor is deactivated and the first thyristor activated. It is thereby ensured that the system returns to a stable initial state.

One form of embodiment of the proposed method specifies that after preparation of the commutation process a fourth check is carried out as long as the time to the anticipated next zero transition of the tap voltage is greater than the commutation time period. In that case, it is checked whether the amount of the tap voltage falls below a limit value of the tap voltage and the result is evaluated as positive if this is the case. If the result of the third check and the result of the fourth check are evaluated as positive, commutation is initiated. Otherwise, commutation is broken off in that the second thyristor is deactivated and the first thyristor activated.

It is advantageous to limit the maximum tap voltage for the switching-over instant so as to thus minimise the loading of the thyristors. For preference, the limit value of the tap voltage, by which the voltage loading of the thyristors is minimised, is 30% or 40% or 50% or 60% or 70% of the amount of the peak value of the tap voltage. In that case, minimisation of the voltage loading of the thyristors leads to a more advantageous design, a prolonged service life and increased reliability of the overall system.

One form of embodiment of the proposed method specifies that if commutation in accordance with the first commutation strategy has been broken off more often than a predetermined number and/or the phase displacement between the load current and the tap voltage is not sufficiently large, commutation in accordance with a second commutation strategy is carried out. In this second commutation strategy a trigger instant for forced commutation is waited out after receipt of the commutation command. On reaching the trigger instant for forced commutation the fourth thyristor is deactivated and the third thyristor activated. After the zero transition of the tap voltage the first thyristor is deactivated and the second thyristor activated.

Execution of forced commutation can be necessary, for example, if a critical operating state of the regulating transformer or of a load supplied by the regulating transformer is present and undelayed regulation for safe operation of the entire system is essential. In this case, immediate forced commutation can be initiated by the control unit.

If normal commutation has been broken off several times in succession it can be concluded therefrom that the external system conditions such as, for example, phase displacement and distortions of currents and voltages do not allow normal commutation and a rapid change of system conditions is not to be anticipated. In this case, the control unit can similarly initiate forced commutation.

For evaluation of critical operating states of the regulating transformer or of the supplied load it is possible for further parameters and limit values, for example with respect to relevant system variables, to be filed in the control unit.

For preference, the value 3, 5, 7 or 10, for example, is selected for the predetermined number of broken-off commutation strategies.

A preferred form of embodiment of the proposed method specifies that the trigger instant in the case of forced commutation is determined in accordance with a function of the hold-off interval of the thyristors as well as the maximum current load resulting from the second commutation strategy. The hold-off interval of the thyristors in that case is composed of the recovery time of the thyristors and a safety margin. The safety margin can then also be variable and, for example, depend on the amount of the voltage or the current at the thyristor at a specific instant.

A preferred form of embodiment of the proposed method specifies that the commutation time period corresponds with the sum of the overlap time and the hold-off interval of the thyristors.

A preferred form of embodiment of the proposed method specifies that the overlap time depends on the trigger angle a and the load current and describes the time in which both switching elements of a commutation cell are conductive during a commutation process.

A preferred form of embodiment of the proposed method specifies that $$\varphi cap < \varphi \leq 0,$$

wherein $\varphi cap < 0$, for the limit value of the phase displacement $\varphi$ between load current and tap voltage, wherein $\varphi cap$ represents a negative capacitive limit value.

The negative capacitive limit value can be, for example, $-5°$, $-7.5°$, $-10°$, $-12.5°$, $-15°$ or $-40°$.

According to a second aspect the invention proposes a computer program product, wherein the computer program product is provided on a non-volatile and computer-readable medium and causes a control unit to execute a method in accordance with the first aspect according to the invention.

The explanations with respect to one of the aspects of the invention, particularly with respect to individual features of this aspect, correspondingly also apply in analogous manner to the other aspects of the invention.

Forms of embodiment of the invention are explained in more detail in the following with reference to the accompanying drawings. However, the individual features evident therefrom are not limited to the individual forms of embodiment, but can be connected or combined with further above-described individual features or with individual features of other forms of embodiment. The details in the drawings are to be understood only as explanatory and not as limiting. The reference numerals present in the claims are not restrict the scope of protection of the invention in any way, but merely refer to the features in the drawings and contribute to an understanding of the invention.

Figure 1:
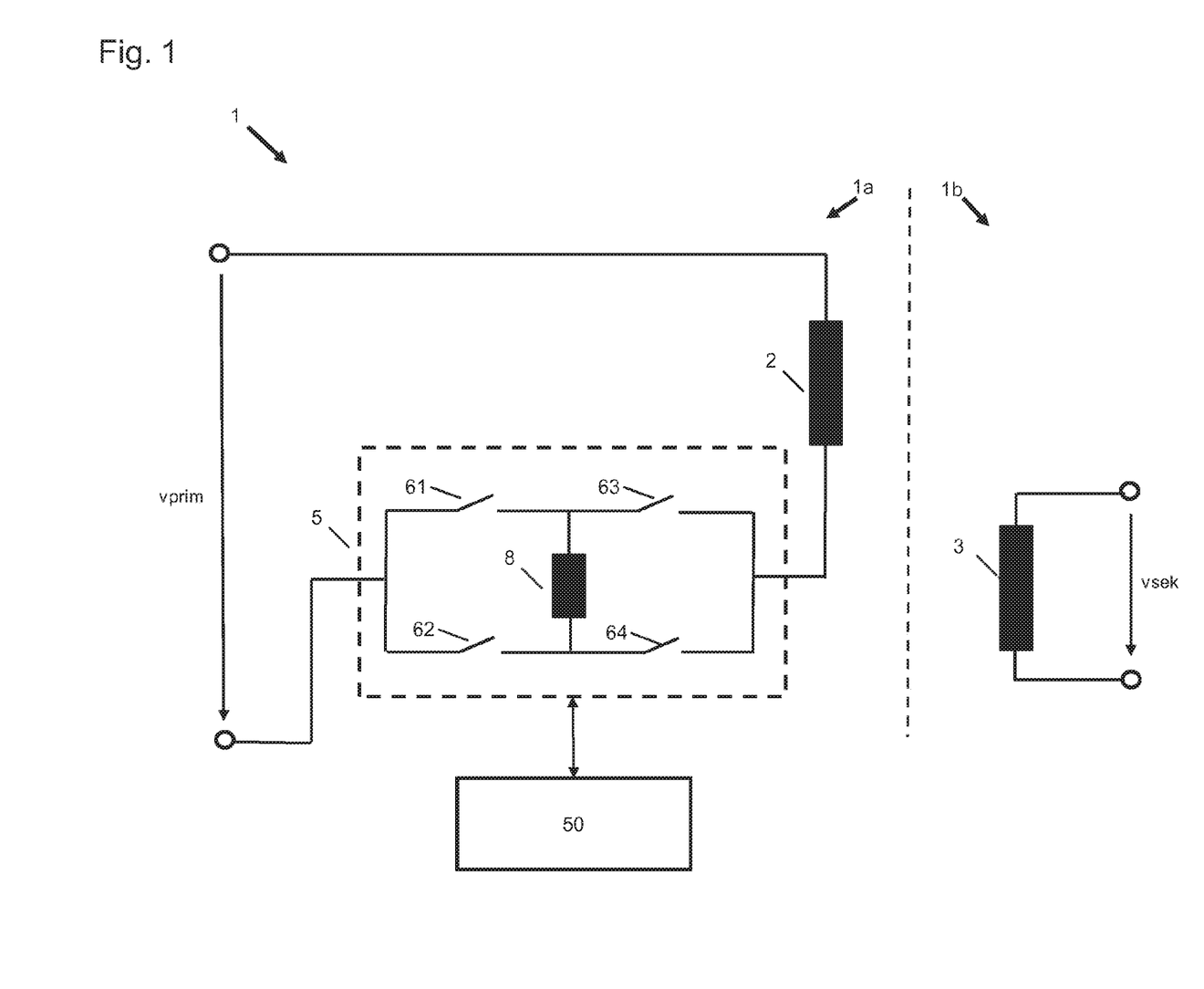
FIG. 1 shows a schematic illustration of a regulating transformer with power-electronic switching modules.

FIG. 1 shows the schematic construction of a regulating transformer 1. The regulating transformer 1 consists of a regulable primary side 1a and a secondary side 1b. The primary side 1a comprises a main winding 2 and a switching module 5. The secondary side 1b comprises the secondary winding 3. The switching module 5 comprises a regulating winding 8 and the switching elements 61, 62, 63 and 64. The output voltage vsek, which decays across the secondary winding 3, is dependent on the input voltage vprim across the primary side of the regulating transformer 1 as well as the translation ratio of the regulating transformer 1. The translation ratio of the regulating transformer 1 and thus the output voltage vsek can be influenced by way of the connection of the main winding 2 with the regulating winding 8. Three possible configurations arise for connecting the regulating winding 8 with the main winding 2 by means of the switching elements 61, 62, 63 and 64. In a first configuration the regulating winding 8 can be connected in series with the main winding 2. In a second configuration the regulating winding 8 can be connected oppositely to the main winding 2. In a third configuration the regulating winding 8 can be disconnected from the circuit. In this case, the regulating winding 8 does not conduct current. Control of the commutation cells 9a, 9b takes place by way of a control unit 50. If required, several switching elements 5 can also be connected in series. Moreover, regulation on the secondary side 3 of the regulating transformer 1 by means of one or more switching modules 5 is also possible.

Figure 2A:
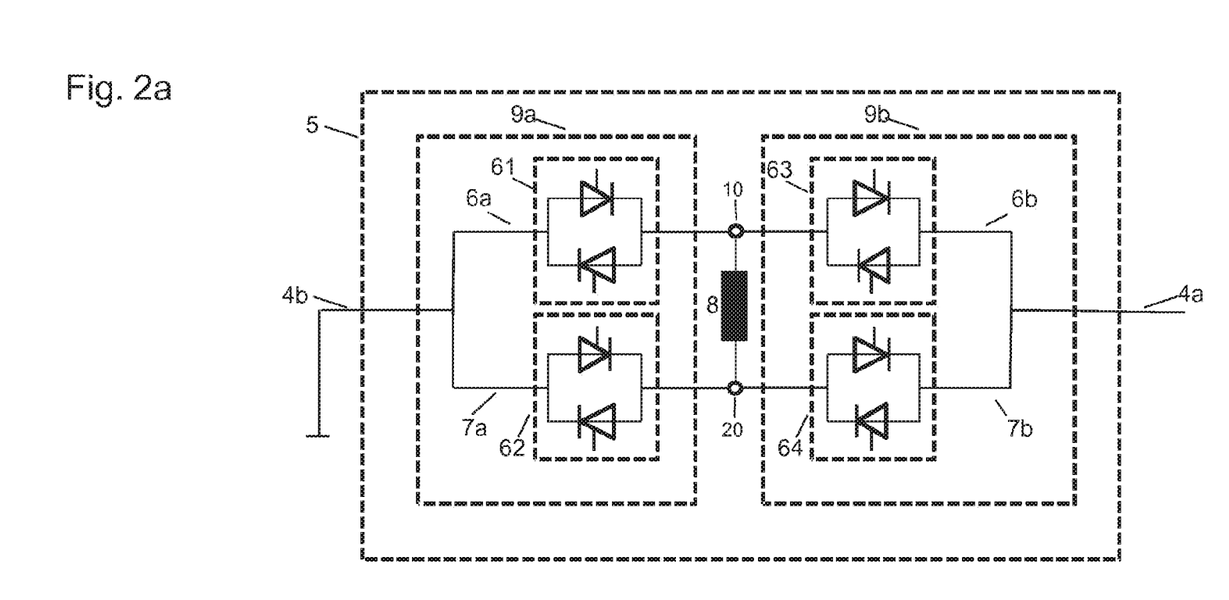
FIG. 2a shows the construction of a power-electronic switching module inclusive of regulating winding.

FIG. 2a shows the schematic construction of the switching module 5. The switching module 5 comprises two commutation cells 9a, 9b and the regulating winding 8. Each commutation cell 9a, 9b has a first load branch 6a, 6b as well as a second load branch 7a, 7b arranged in parallel therewith. The regulating winding 8 is arranged between a first terminal 10 and a second terminal 20. The switching module 5 additionally comprises a feed-in line 4a to the switching module and a feed-out line 4b from the switching module 5.

Figure 2B:
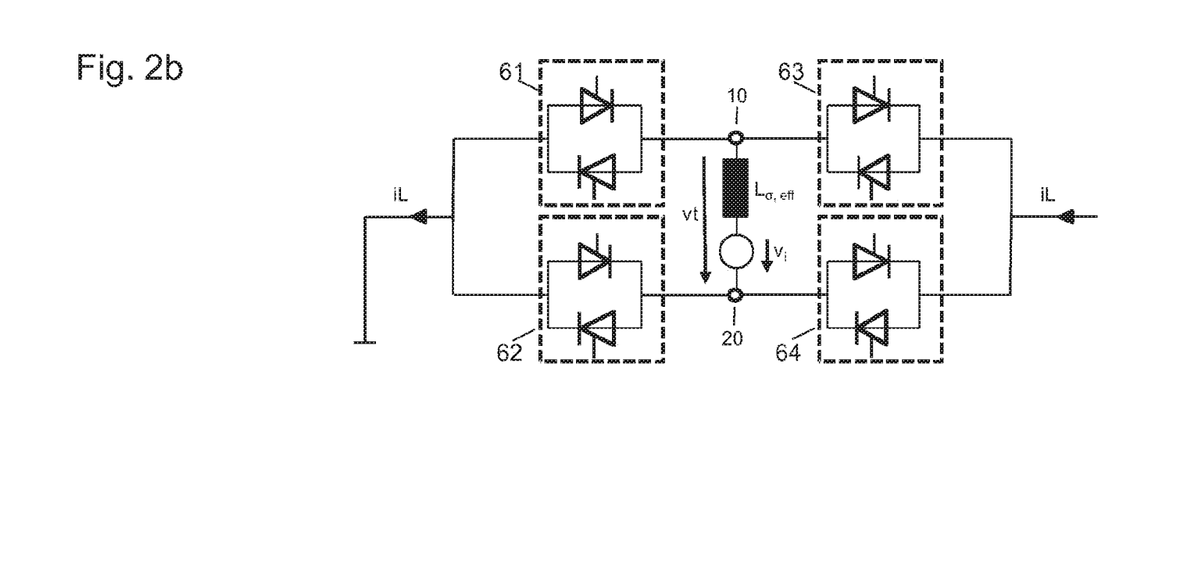
FIG. 2b shows the electrical equivalent circuit diagram inclusive of electrical magnitudes of the switching module in question.

FIG. 2b shows the electrical magnitudes used in the following for clarification of the method for commutation control. The load current iL (sinusoidal alternating current) describes the load current which can flow in the feed-in line 4a from the main winding 2 to the switching module 5 and in the feed-out line 4b from the switching module 5. The load current iL is defined as positive when, as shown in FIG. 2b, it flows in the feed-out line 4b from the switching module 5. The tap voltage vt (sinusoidal tap voltage) decays across the regulating winding 8 and lies between the terminals 10 and 20. The tap voltage vt is defined as positive when the voltage drop takes place from the terminal 10 in the direction of the terminal 20. In the equivalent circuit diagram the regulating winding 8 is modelled as a sinusoidal voltage source in series with a stray inductance $L_{o,\,eff}$ of the regulating transformer 1. In that case, the induced voltage vi represents the induced voltage of the regulating winding 8 and $L_{o,\,eff}$ represents the effective stray inductance of the regulating transformer 1 during the commutation process.

Figure 3:
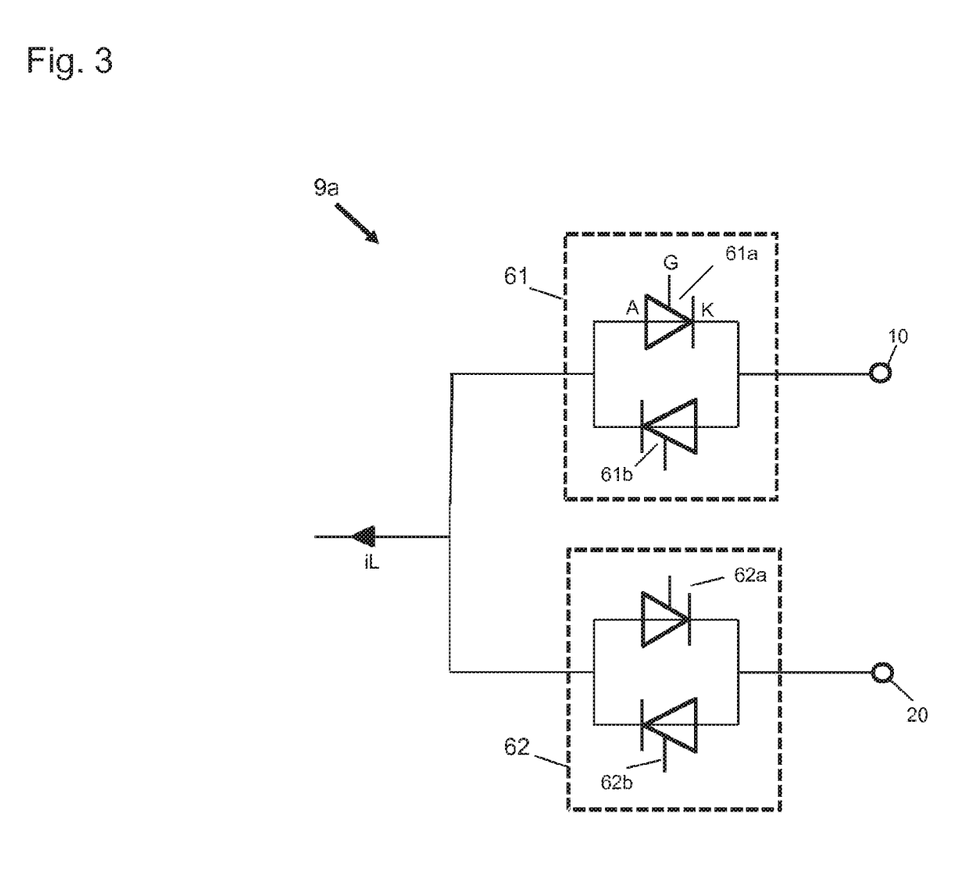
FIG. 3 shows the schematic construction of a commutation cell.

FIG. 3 shows a schematic construction of a commutation cell 9a. An upper switching element 61 is arranged between the first terminal 10 and the feed-out line 4 and the lower switching element 62 is arranged between the second terminal 20 and the feed-out line 4. Each switching element 61, 62 consists of an upper thyristor 61a, 62a and a lower thyristor 61b, 62b, which are connected with one another in antiparallel manner. Each thyristor 61a, 61b, 62a, 62b has an anode terminal A, a cathode terminal K and a gate terminal G. Each switching element 61, 62 can adopt two switching states, i.e. a conducting state or a blocking state. In the normal state, the load current iL flows, in accordance with the respective switching state of the switching elements 61, 62, either through the upper switching element 61 in the first load branch 6a or the lower switching element 62 in the second load branch 7a. During a commutation process, a current briefly flows through both switching elements 61, 62 in the load branches 6a and 7a.

The proposed method for commutation of current in a commutation cell 9a according to FIG. 3 with the object of changing the translation ratio of the regulating transformer 1 is described in more detail in the following. By way of example, the method is in that case described on the basis of commutation of the load current iL from the upper—in this case first—switching element 61 to the lower—in this case second—switching element 62. Prior to the commutation process, the two antiparallel thyristors 61a, 61b of the first switching element 61 are accordingly activated and the first switching element 61 is conductive. In addition, the two antiparallel thyristors 62a, 62b of the second switching element 62 are deactivated and the second switching element 62 is blocking. The following explanations apply to commutation of the load current iL from the first switching element 61 to the second switching element 62 in the negative half wave of the tap voltage vt. With respect to the adjoining commutation cell 9b the lower switching element 64 is switched to be conducting and the upper switching element 63 to be blocking. Moreover, in the following a capacitive load case prevails in which the load current iL leads the tap voltage vt. Relevant limitations or modifications for the inductive load case in which the load current iL trails the tap voltage vt are described hereinafter at the appropriate point.

Further possible cases of commutation can be analogously represented by way of the following rules:

commutation from the second switching element 62 to the first switching element 61 by exchange of the thyristor 61a with the thyristor 62a, exchange of the thyristor 61b with the thyristor 62b and inversion of the induced voltage vi;

commutation in the positive half wave of the tap voltage vt by exchange of the thyristor 61a with the thyristor 61b, exchange of the thyristor 62a with the thyristor 62b and inversion of the load current iL and the induced voltage vi;

consideration of the case that the adjoining commutation cell 63 conducts and the commutation cell 64 blocks, in that the induced voltage is increased by the proportion $L_{o,\,eff}$ $$\frac{diL}{dt};$$

and for simultaneous commutation in both switching cells 9a, 9b there applies on the basis of symmetrical construction of the two commutation cells 9a, 9b:

thyristor 63a ≙ thyristor 62a;

thyristor 63b ≙ thyristor 62b;

thyristor 64a ≙ thyristor 61a; and thyristor 64b ≙ thyristor 61b.

Figure 4:
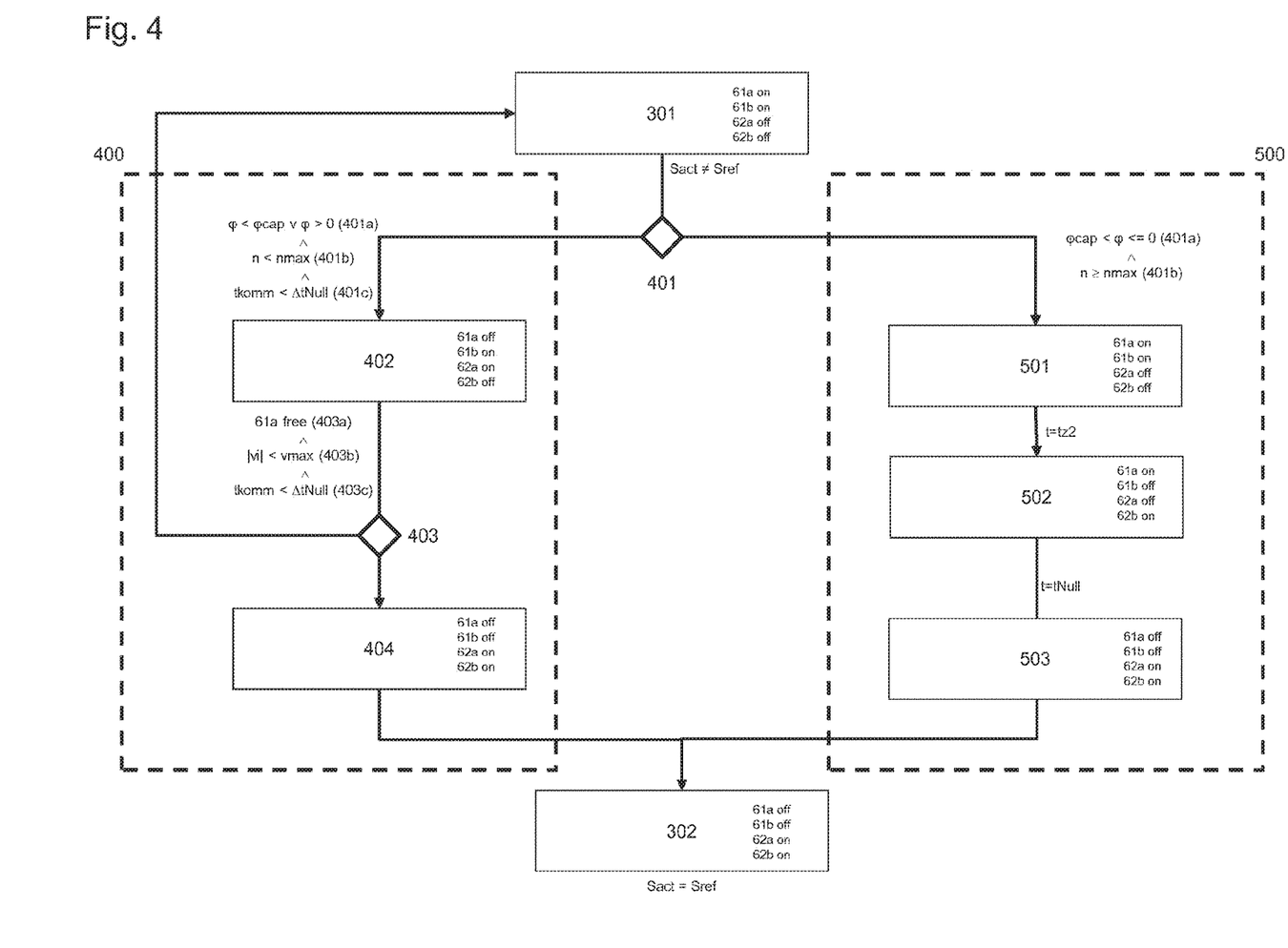
FIG. 4 shows a flow chart of the proposed method for commutation control.
Figure 5A:
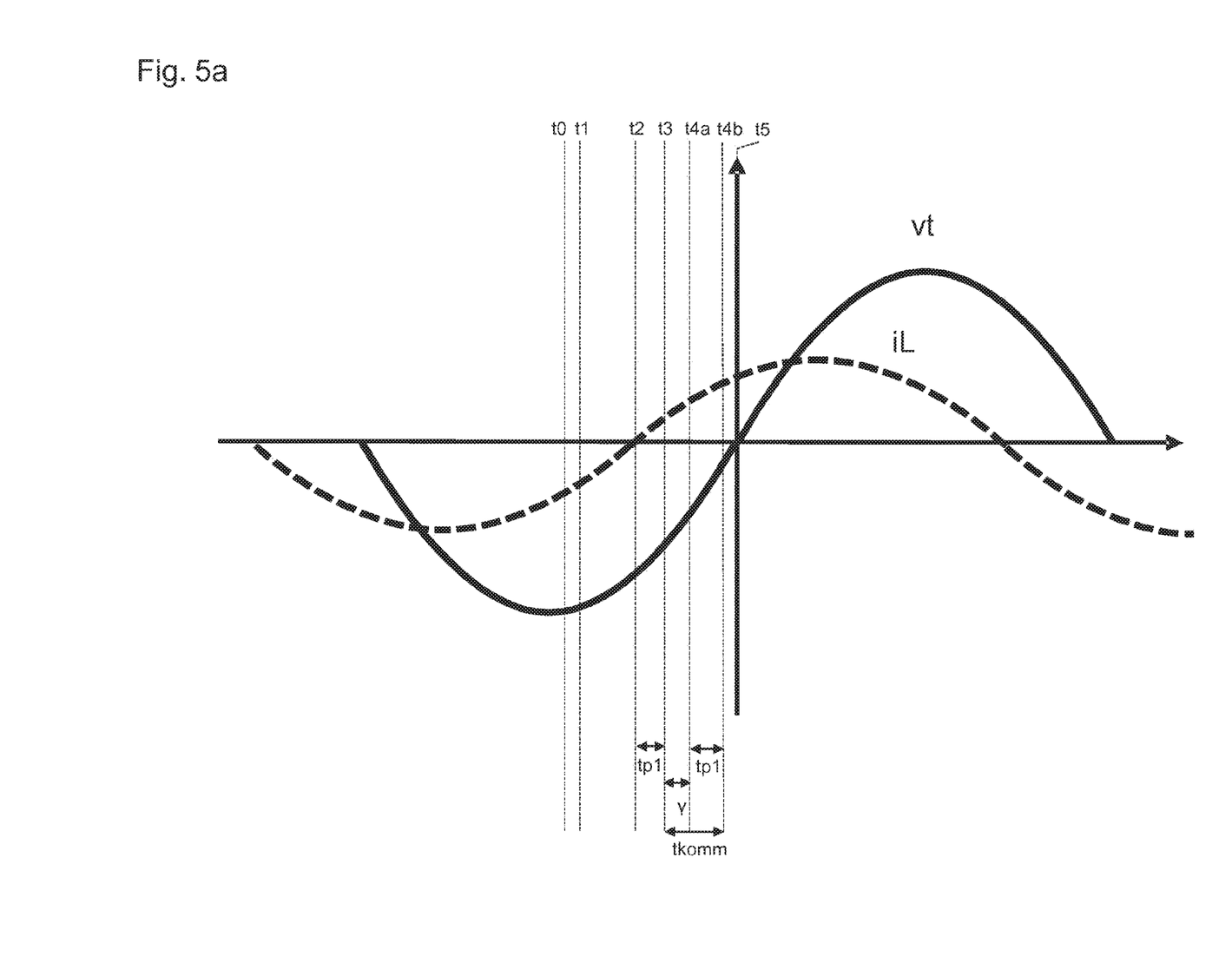
FIG. 5a shows a time plot of current and voltage in the commutation cell of FIG. 3 inclusive of the instants t0-t5, which are relevant for performance of the method, for normal commutation in accordance with the method of FIG. 4.
Figure 5B:
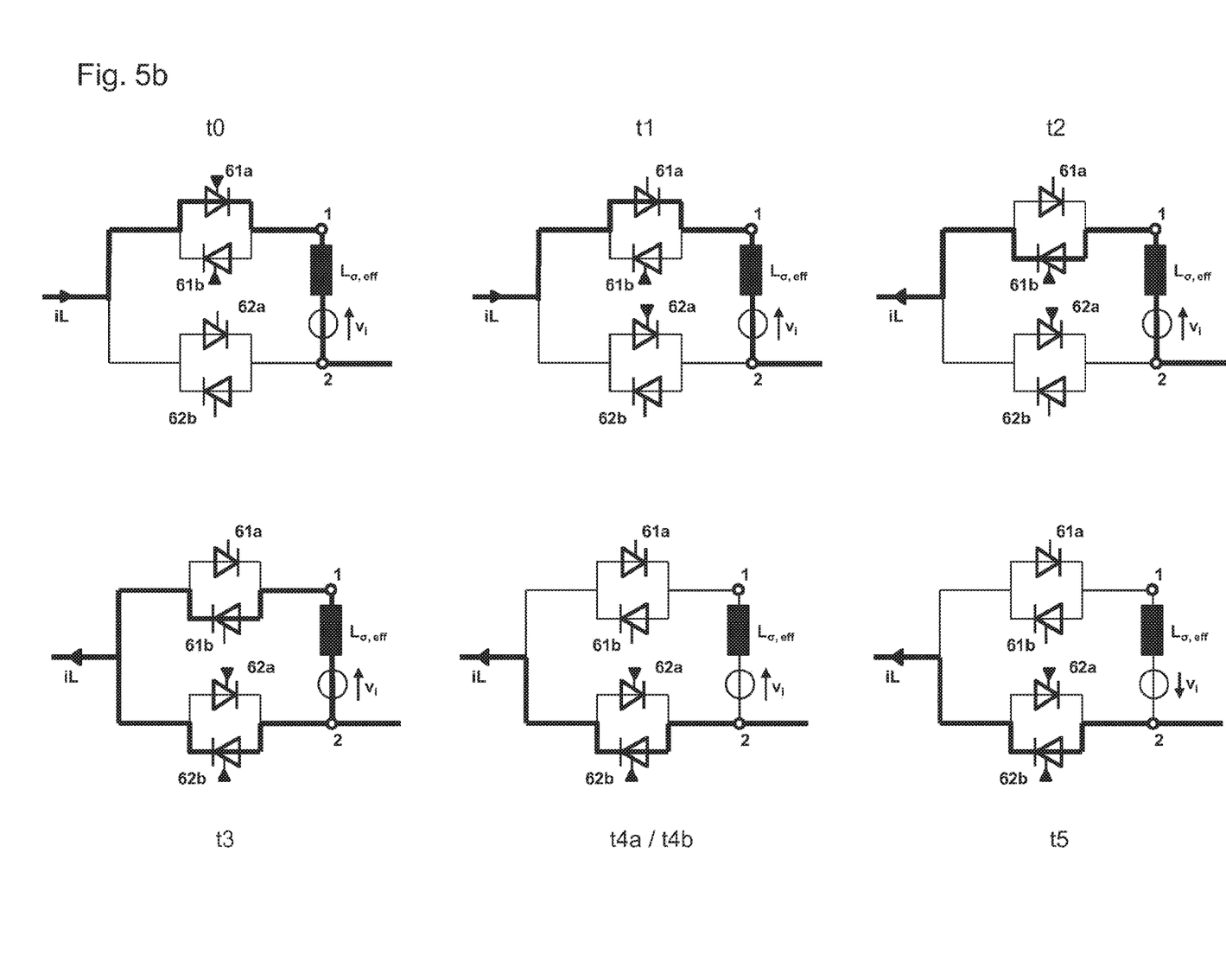
FIG. 5b shows states of the thyristors as well as states of the commutation cell for normal commutation in accordance with the method of FIG. 4.

FIG. 4 shows the general sequence of the method. The time sequence of the commutation process inclusive of plots of the tap voltage vt and the load current iL is illustrated in FIG. 5a. The state of the thyristors and the states of the commutation cell for the phases of the commutation process are illustrated in FIG. 5b.

In the initial state 301 the thyristors 61a and 61b are activated and the first switching element 61 is thus conducting. The thyristors 62a and 62b are deactivated and the second switching element 62 is thus blocking. The load current iL and the induced voltage vi both have a negative sign and the load current iL flows through the thyristor 61a.

At the instant t=t0 (see FIG. 5a) a commutation requirement for commutation of the load current iL from the first load branch 6a to the second load branch 7a takes place on the basis of the control unit 50. The instantaneous status Sact of the thyristors 61a, 61b, 62a and 62b thus no longer corresponds with the desired status Sref. The instant t0 at which the commutation requirement takes place can in that case be a desired instant in the negative half wave of the tap voltage vt. According to the method, it is now sought to perform commutation in accordance with a first commutation strategy 400, also termed normal commutation in the following.

For that purpose it is initially checked in a check 401 whether the basic preconditions for a normal commutation process are fulfilled. Preconditions for a normal commutation process are:

sufficiently large phase displacement φ between load current iL and tap voltage vt;

sufficient spacing from the next zero transition of the tap voltage vt;

normal commutation has not already been broken off multiple times (nmax).

A sufficiently large phase displacement for commutation is present when the phase angle is smaller than a negative capacitive limit value φcap. This condition is necessary in order to guarantee secure recovery and secure build-up of the blocking capability of the thyristor 61b in the further course of the commutation. The limit value φcap can be determined as follows:

Initially, the minimum trigger angle at which normal commutation is possible is utilised. This is calculated for the capacitive case from:

$$\alpha min=\varphi+\delta 61a-\omega\cdot\gamma(iL, \alpha min) \quad (1)$$

wherein

αmin: minimum trigger angle in rad

δ61a: hold-off interval of the thyristor 61a in rad

γ: overlap time dependent on trigger angle α and load current iL, which describes the time during the commutation in which both switching elements 61, 62 are conducting ω: frequency of the inducted voltage vi in rad/s φ: phase displacement between load current iL and tap voltage vt The overlap time γ is in that case calculated with use of the equivalent circuit diagram according to FIG. 2b, as follows:

$$\gamma=(-a\, \cos(iL\cdot\omega\cdot L_{\alpha,\mathit{eff}}/Vs+\cos\alpha)-\alpha)/\omega$$

wherein:

Vs: peak value of the induced voltage vi

The maximum trigger angle at which normal commutation is possible is limited by:

$$\alpha max+\omega\cdot\gamma(iL, \alpha max)=-\delta 61b \quad (2)$$

wherein:

αmax: maximum trigger angle in rad

δ61b: hold-off interval of the thyristor 61b in rad

The maximum phase displacement for which normal commutation is possible thus arises through equating (1) and (2). On the assumption that the hold-off intervals of the thyristor 61a and the thyristor 61b are equal, there thus results for the limit value φcap:

$$\varphi cap=-2\cdot\delta \quad (3)$$

wherein:

φcap: negative capacitive limit value of the phase displacement φ

δ: hold-off interval of the thyristors in rad

In the case of an inductive load situation the equation applies:

$$\varphi>0$$

A sufficient spacing from the next anticipated zero transition of the tap voltage vt is present when the time to the next anticipated zero transition of the tap voltage vt is greater than a commutation time period tkomm. In that case, tkomm represents the sum of the overlap time γ and the hold-off interval tp1. On the assumption that all thyristors have the same hold-off intervals there applies:

$$tkomm=\gamma+tp1$$

wherein:

tkomm: commutation time period tp1: hold-off interval of the thyristors in seconds In order to ensure a sufficient spacing from the next zero transition of the tap voltage vt the following condition must thus be fulfilled:

$$tkomm<\Delta tNull$$

wherein:

ΔtNull: time to the next anticipated zero transition of the voltage vt

As described in the following, the commutation is broken off if the appropriate conditions for reliable normal commutation are not fulfilled. If normal commutation has been broken off several times in succession, it can be concluded therefrom that the external system conditions such as, for example, phase displacement, or the distortion of load current iL and tap voltage vt, do not allow normal commutation. In order to recognise this case in good time it is checked prior to initiation of the normal commutation process whether commutation has already been broken off several times. In this connection, several times signifies, for example, three times, five times or seven times.

If the above-mentioned conditions are fulfilled, the check 401 is evaluated as positive and a normal commutation process is carried out. For that purpose, the normal commutation is prepared in step 402 in that at the instant t1 in FIG. 5a the thyristor 61a is deactivated and the thyristor 62a activated. Activation of the thyristor 62a is necessary in order to make available a load path in the case of an unexpected change in the direction of the load current iL. The corresponding configuration of the commutation cell at the instant t1 can be inferred from FIG. 5b.

After preparation of the commutation according to step 402, a further check is carried out in order to ensure faultless performance of the commutation in step 403. In that case it is checked whether the conditions for initiation of commutation are fulfilled. These conditions are as follows:

the previously deactivated thyristor 61a has recovered;

there is a sufficient spacing from the next zero transition of the tap voltage vt; and the amount of the induced voltage vi at the time of initiation of commutation lies below a limit value vmax of the tap voltage.

In order to recover, the thyristor 61a should not conduct any current over a specific time period tp1 (hold-off interval) when the gate drive is deactivated. The hold-off interval tp1 is composed of the recovery time of the thyristor and a safety margin. The safety margin can in that case also be variable. In the present commutation case the thyristor 61a no longer conducts current only after change in the sign of the load current iL. This is the case at the instant t2, in that the sign of the load current iL changes from negative to positive and the thyristor 61b takes over the load current iL in the upper load branch.

In accordance with the normal commutation strategy it is now monitored whether for the duration of the hold-off interval tp1 of the thyristor 61a no current flows through this thyristor 61a. This is carried out, for example, by observation of the direction of the load current iL or by measurement of the current directly at the thyristor 61a. As soon as, for the duration of the hold-off interval tp1 of the thyristor 61a, this thyristor 61a does not conduct current it is ensured that this thyristor 61a has recovered and an undesired further triggering or return triggering of the thyristor 61a on the occasion of commutation from the upper load branch 6a to the lower load branch 6b is avoided.

Moreover, there is already carried out in step 401—even prior to initiation of the commutation—a check whether sufficient spacing from the next anticipated voltage zero transition is present in accordance with the condition:

$$t_{komm} < \Delta t_{Null}$$

Apart from the two above checks, the amount of the tap voltage vt is preferably also monitored. The amount of the tap voltage vt on initiation of commutation is a critical factor for loading of the thyristors. To that extent, the amount of the tap voltage which arises at the time of commutation and has to be held by the thyristors is preferably limited to a predetermined value so as to increase the service life and reliability of the thyristors and thus reduce the costs of the overall system. For preference, 50% of the rated voltage vt is selected as maximum tap voltage at which commutation can be initiated.

If all three above-mentioned conditions are fulfilled, commutation from the upper load branch 6a to the lower load branch 6b is initiated at the instant t3 in a step 404 in that the thyristor 61b is deactivated and the thyristor 62b activated. As soon as the thyristor 62b is activated, the current through the thyristor 61b decreases until the entire load current iL flows through the thyristor 62b. This is the case after elapsing of the overlap time y at the instant t4a (see also FIG. 5b, instant t4a/t4b). After the instant t4a, there is still sufficient time (at least the hold-off interval tp1) for the thyristor 61b to recover before the next anticipated zero transition of the tap voltage vt. On expiry of the hold-off interval tp1 at the instant t4b, the thyristor 61b has accordingly reached its full blocking capability. A repeat, undesired triggering of the thyristor 61b at the succeeding zero transition of the tap voltage vt is thus precluded. At the instant t5 the tap voltage vt also changes its sign and the load current iL again flows in the lower load branch 6b. The commutation is thus ended and the final state 302 reached, in which the instantaneous status Sact of the thyristors 61a, 61b, 62a and 62b corresponds with the status Sref predetermined by the control.

If within the scope of the check (step 403) not all conditions are fulfilled, commutation is broken off. For that purpose the thyristor 61a is activated and the thyristor 62a deactivated. Thus, after commutation has been broken off the system is again disposed in its initial state 301.

If the conditions of the check 401 are not fulfilled and/or a commutation process has already been broken off several times (number n of the breakings-off greater than a predetermined number nmax), but nevertheless commutation from the upper to the lower load branch is to be carried out, an alternative commutation process 500—which is also termed forced commutation 500 in the following—can be carried out. The necessity for a forced commutation 500 can be present, for example, if a critical operating state of the regulating transformer 1 exists or the load supplied by the regulating transformer 1 is present and an immediate regulation for safe operation of the overall system is essential. For the forced commutation 500, after receipt of the commutation command for commutation of the load current iL from the upper to the lower switching element it is waited in a step 501 until the necessary preconditions for forced commutation are present. Necessary conditions for forced commutation are:

sufficiently large spacing from the zero transition of the tap voltage vt, so that sufficient time for the thyristor 61b to recover is available; and a sufficiently small spacing from the zero transition of the tap voltage vt so as to avoid unnecessarily high current densities during the commutation process.

Figure 6:
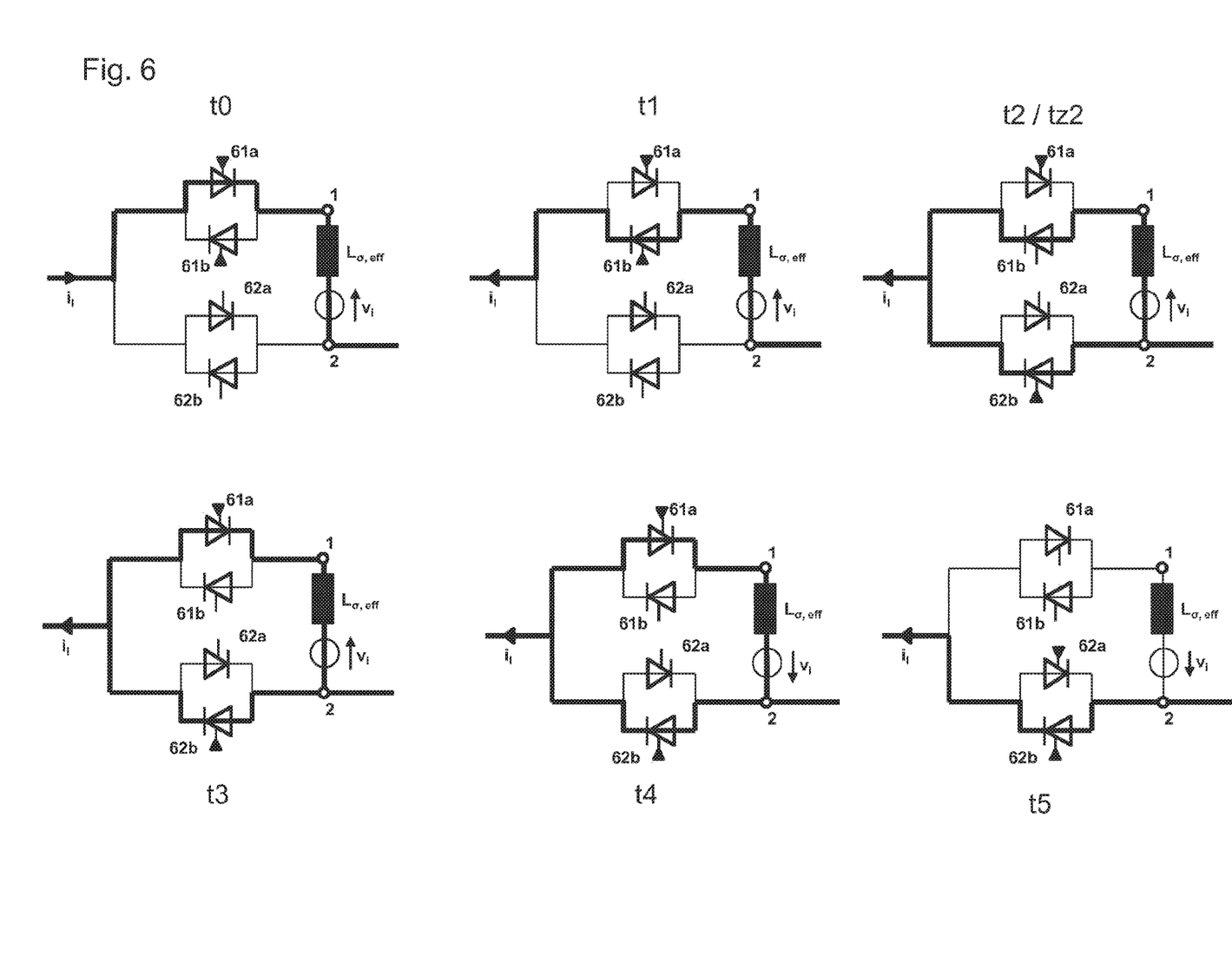
FIG. 6 shows states of the thyristors and states of the commutation cell for forced commutation in accordance with the method of FIG. 4.

As soon as these conditions are present, a forced commutation is carried out in accordance with the alternative commutation method. The states of the thyristors and of the switching elements 61, 62 in the individual steps of the forced commutation are depicted in FIG. 6.

Figure 7:
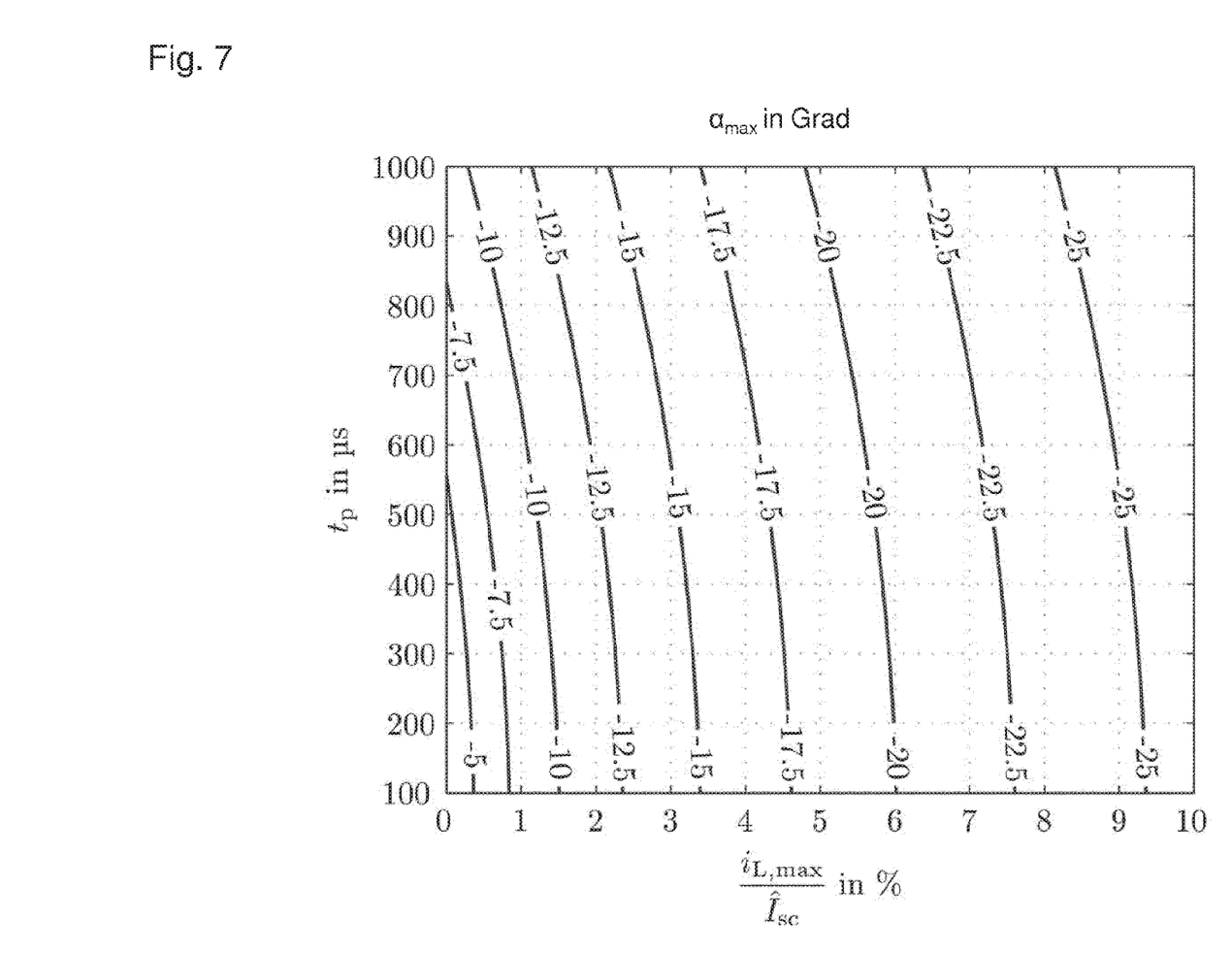
FIG. 7 shows the trigger instant t (in degrees) at which forced commutation is initiated, in dependence on the hold-off interval of the thyristors as well as maximum load current and peak value of the short-circuit current $\hat{I}_{SC}$.

At the instant t0 the tap voltage vt is disposed in its negative half wave, the load current iL is similarly negative, the upper switching element 61 is conducting, the lower switching element 62 is blocking and the thyristor 61a conducts the load current iL. In step 501 initially the instant tz2, at which the necessary conditions for forced commutation 500 are fulfilled, for initiation of the forced commutation 500 is waited for. The optimum instant tz2 as a function of the hold-off time tp1 and the maximum load current can be inferred from, for example, FIG. 7. In that case, iL,max corresponds with the theoretically possible maximum amount of the load current iL and ÎSC represents the peak value of the short-circuit current which builds up after activation of the thyristor 62b in the commutation cell. According to FIG. 6, initially a change in sign of the load current iL takes place so that the thyristor 61b at the instant t1, after change in direction of the load current iL has taken place, conducts the load current iL.

As soon as the optimum trigger instant tz2 has been reached, initiation of forced commutation takes place in a step 502 in that the thyristor 61b is deactivated and the thyristor 62b activated. Through activation of the thyristor 62b a brief short-circuit of the terminals 10 and 20 is produced so that at the instant t3, which lies directly after the trigger instant tz2, a transient short-circuit current through the thyristors 61a and 62b builds up (cf. FIG. 6, t3). After the zero transition of the induced voltage vi at the instant t4 the short-circuit current decays again. This is characterised in FIG. 4 by the instant t=tNull. During that, there is sufficient time for the thyristor 61b to fulfil its conditions for recovery. The forced commutation is concluded at the instant t5, the thyristor 61a is deactivated and the thyristor 62a activated (step 503 in FIG. 4). The system is now in the desired state 302 in which the instantaneous status Sact of the thyristors 61a, 61b, 62a and 62b corresponds with the status Sref predetermined by the control.

Figure 8:
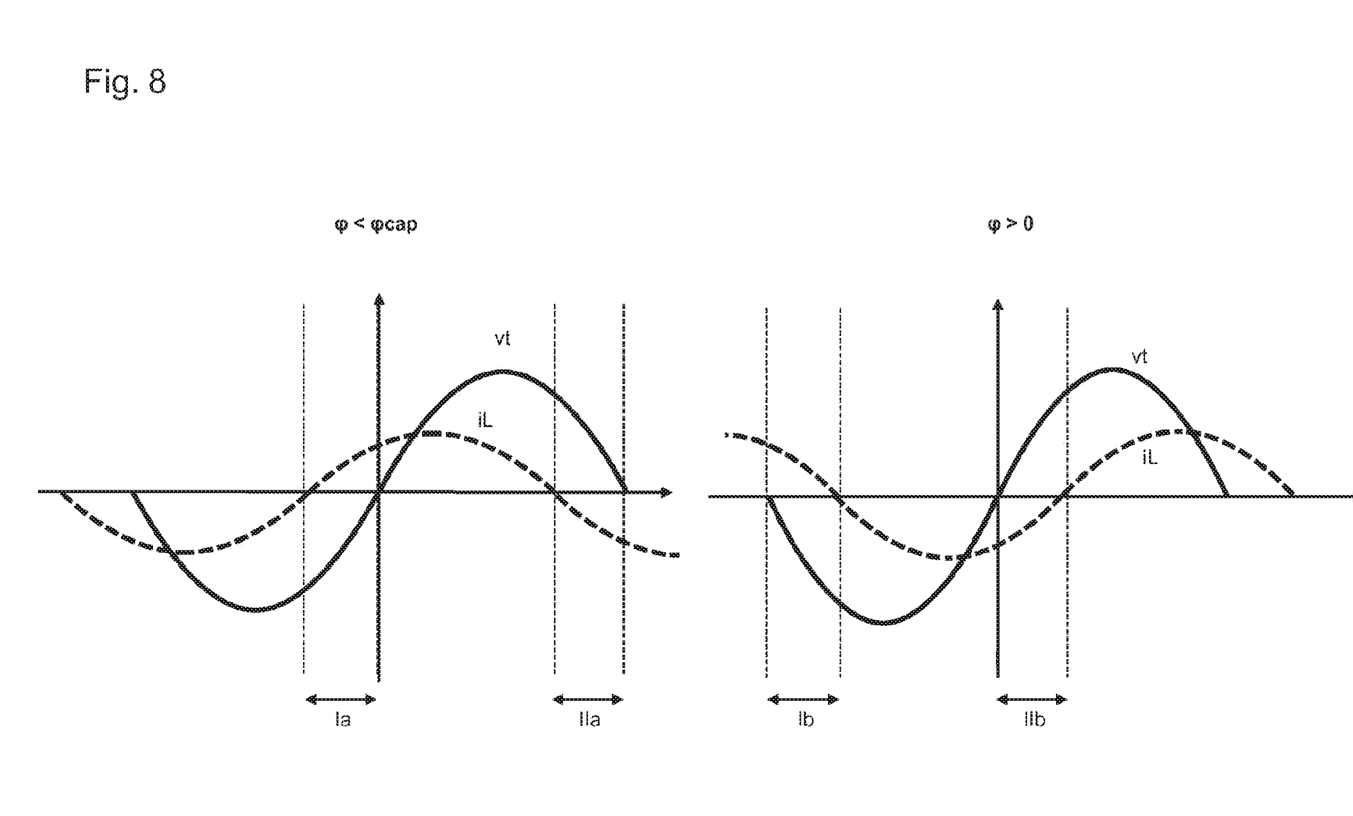
FIG. 8 shows regions in which normal commutation is possible in the inductive and capacitive load case.

The conditions and sequences for normal commutation in the case of an inductive load situation, i.e. the load current iL trails the tap voltage vt, can be derived in simple manner from the above-described capacitive load case. Reference may be made for that purpose to FIG. 8, in which the capacitive load case is depicted on the left and the inductive load case depicted on the right. The actual physical commutation process takes place, as explained, only in regions in which load current iL and tap voltage vt have different signs. These regions are characterised in FIG. 8 by Ia, Ib, IIa and IIb. The region Ia in the capacitive case in which the tap voltage vt is negative and the load current iL is positive in that case corresponds with the region Ib in the inductive load case. The regions IIa and IIb correspond analogously therewith. Thus, the above-mentioned statements with respect to the region Ia of the capacitive load case analogously apply to the region Ib of the inductive load case.

It is to be noted that, with respect to an inductive load, if a commutation requirement for normal commutation is set outside the region Ib and IIb a breaking-off of commutation is always carried out. This is due to the fact that the check activated in step 403 might not always turn out to be positive, since a first thyristor 61*a*, which belongs to the first switching element 61 and lies in blocking direction with respect to the induced voltage vi, can never recover before the zero transition of a tap voltage vt, since the zero transition of the tap voltage vt takes place before the zero transition of the load current iL. In this case, the commutation requirement remains in place and can be carried out after the voltage zero transition, thus in the region Ib or IIb.

For forced commutation, there are no further specifics for the inductive load case.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

Below is a list of relevant reference numerals:
1 regulating transformer, primary side, secondary side
1*a* primary side
1*b* secondary side
2 main winding
3 secondary winding
4*a* feed-in line
4*b* feed-out line
5 switching module
6*a*, 6*b* first load branch
7*a*, 7*b* second load branch
8 regulating winding
9*a*, 9*b* commutation cell
10 first terminal
20 second terminal
50 control unit
61 switching element
62 switching element
63 switching element
64 switching element
61*a*, 61*b*, 62*a*, 62*b* thyristors
301 initial state
302 final state
400 commutation strategy
401 check
402 step
403 check
404 step
500 alternative commutation method, forced commutation
501 step
502 step
503 step
A anode terminal
K cathode terminal
G gate terminal
iL load current
$\hat{I}_{SC}$ peak value of the short-circuit current
$L_{o,\mathit{eff}}$ stray inductance of the regulating transformer
vi induced voltage
vmax limit value of the tap voltage
vprim input voltage
vsek output voltage
vt tap voltage
Sact instantaneous status
Sref desired status
t0 . . . t5 instants
ΔtNull time spacing from next anticipated zero transition of the voltage vt
φ phase displacement between load current iL and tap voltage vt
φcap negative capacitive limit value of the phase displacement φ
α trigger angle of the thyristors in rad
αmin minimum trigger angle for commutation in the capacitive region
αmax maximum trigger angle for commutation in the capacitive region
δ hold-off period of the thyristors in rad
γ overlap time depending on trigger angle α and load current iL, which describes the time during commutation in which both switching elements 61, 62 are conducting
ω frequency of the induced voltage vi in rad/s
tp1 hold-off interval of the thyristors in seconds
tkomm commutation time period defined by the sum of the overlap time γ and the hold-off interval tp1 of the thyristors
tz2 trigger instant for forced commutation

The invention claimed is:

1. A method of controlling at least one switching module comprising a first commutation cell and a second commutation cell, which are each associated with a regulating winding of a regulating transformer by way of a first terminal and a second terminal, wherein each of the at least one switching module is provided with a feed-in line and a feed-out line and wherein the first commutation cell and the second commutation cell comprise:
   a first switching element having two thyristors in antiparallel connection; and
   a second switching element having two thyristors in antiparallel connection;
   wherein the method comprises:
      determining a tap voltage which is present between the first terminal and the second terminal and represents a voltage across the regulating winding of the regulating transformer;
      determining an induced voltage representing the induced voltage in the regulating winding;

detecting a load current flowing from the feed-out line of the commutation cell;

determining a phase displacement φ between the load current and the tap voltage;

after receipt of a commutation command for commutation of a current from the first switching element to the second switching element then in accordance with a first commutation strategy a first check is carried out, wherein the first check comprises:

determining whether the phase displacement φ between the load current and the tap voltage lies outside a limit range, and evaluating the result of the first check as positive when the phase displacement φ lies outside the limit range;

a second check is carried out, wherein the second check comprises:

determining whether a time to a next anticipated zero transition of the tap voltage is greater than a commutation time period and that the result is evaluated as positive if this is the case;

if the first check and the second check are positive, the commutation process is prepared in a step in that a first thyristor of the two thyristors belonging to the first switching element and lying in a blocking direction with respect to the induced voltage is deactivated and a second thyristor of the two thyristors belonging to the second switching element and lying in a blocking direction with respect to the tap voltage is activated; and after the preparation of the commutation process, then in another step:

as long as the time to the anticipated next zero transition of the tap voltage is greater than the commutation time period, a third check is carried out as to whether the first thyristor has become free and the third check is evaluated as positive if this is the case; and if the third check is evaluated as positive, the commutation is initiated in a step in that a third thyristor of the two thyristors belonging to the second switching element and lying antiparallel to the second thyristor is activated, and a fourth thyristor of the two thyristors belonging to the first switching element and lying antiparallel to the first thyristor is deactivated; and if the first check and/or the second check is/are not evaluated as positive, no commutation is initiated, or if the third check is not evaluated as positive the commutation in accordance with the first commutation strategy is broken off.

2. The method according to claim 1, wherein the commutation is broken off in that the second thyristor is deactivated and the first thyristor is activated.

3. The method according to claim 1, wherein after the step for preparation of the commutation process:

as long as the time to the anticipated next zero transition of the tap voltage is greater than the commutation time period, a fourth check is carried out as to whether the amount of the induced voltage falls below a limit value of the tap voltage and the result is evaluated as positive if this is the case;

if the result of the third check and that of the fourth check are evaluated as positive, the commutation is initiated; and otherwise the commutation is broken off in that the second thyristor is deactivated and the first thyristor is activated.

4. The method according to claim 1, wherein:

if the commutation in accordance with the first commutation strategy has been broken off more often than a predetermined number, and/or if the phase displacement between load current and the tap voltage lies within the limit range: the commutation in accordance with second commutation process is carried out, wherein:

after receipt of the commutation command:

a trigger instant is waited out in a waiting step;

the fourth thyristor is deactivated and the third thyristor is activated in a step when the trigger instant is reached; and the first thyristor is deactivated and the second thyristor activated in a step after the zero transition of the tap voltage.

5. The method according to claim 4, wherein:

the trigger instant is determined in accordance with a function of a hold-off interval of the thyristors and the maximum current load resulting from the second commutation strategy.

6. The method according to claim 1, wherein the commutation time period corresponds with a sum of an overlap time and a hold-off interval of the first thyristor, the second thyristor, the third thyristor, or the fourth thyristor.

7. The method according to claim 1, wherein an overlap time depends on a trigger angle and the load current and describes a time in which both the first switching element and the second switching element of a commutation cell are conductive during the commutation process.

8. The method according to claim 1, wherein;

$$\varphi cap < \varphi \leq 0,$$

wherein φcap<0,
for the limit range of the phase displacement φ between load current and tap voltage.

9. The method according to claim 1, wherein at least one of the first thyristor, the second thyristor, the third thyristor, or the fourth thyristor is activated, when a gate terminal thereof is driven, so as to enable triggering and at least one of the first thyristor, the second thyristor, the third thyristor, or the fourth thyristor is deactivated, when the gate terminal thereof is not driven, so as to prevent triggering.

10. A non-volatile, computer readable medium comprising computer executable instructions, which when executed causes a controller to execute a method according to claim 1.

* * * * *